US010679266B2

(12) United States Patent
Amarthaluri et al.

(10) Patent No.: US 10,679,266 B2
(45) Date of Patent: Jun. 9, 2020

(54) SYSTEMS AND METHODS FOR AUTOMATICALLY MODIFYING TITLES FOR PRODUCTS

(71) Applicant: WAL-MART STORES, INC., Bentonville, AR (US)

(72) Inventors: Abilash Amarthaluri, San Jose, CA (US); Nikita Maple Sudan, Sunnyvale, CA (US); Zuzar Fakhruddin Nafar, Mountain View, CA (US); Chandni Jain, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 398 days.

(21) Appl. No.: 15/605,787

(22) Filed: May 25, 2017

(65) Prior Publication Data
US 2018/0341998 A1  Nov. 29, 2018

(51) Int. Cl.
*G06Q 30/00* (2012.01)
*G06Q 30/06* (2012.01)
*G06F 16/23* (2019.01)
*G06F 16/33* (2019.01)

(52) U.S. Cl.
CPC ..... *G06Q 30/0603* (2013.01); *G06F 16/2365* (2019.01); *G06F 16/3344* (2019.01)

(58) Field of Classification Search
CPC .................................................. G06Q 30/0603
See application file for complete search history.

(56) References Cited

U.S. PATENT DOCUMENTS

| 2013/0060662 | A1* | 3/2013 | Carlson .................. G06Q 30/06 705/26.61 |
| 2013/0290320 | A1 | 10/2013 | Zhu et al. |
| 2014/0089310 | A1* | 3/2014 | Myers .................. G06F 16/355 707/737 |
| 2015/0347572 | A1 | 12/2015 | Yang et al. |
| 2016/0098751 | A1 | 4/2016 | Zimmerman, Jr. et al. |

OTHER PUBLICATIONS

W. W. grainger, inc.; patent issued for system and method for electronically creating a customized catalog (U.S. Pat. No. 9,230,256). (Jan. 18, 2016). Journal of Engineering Retrieved from https://search.proquest.com/docview/1756635409?accountid=14753.*

* cited by examiner

*Primary Examiner* — Kathleen Palavecino
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of identifying one or more product attributes in an existing title for a product, determining at least one product attribute to include in an alternative title for the product, determining that the at least one product attribute in the alternative title for at least a the product does not correspond to the one or more product attributes in the existing title for the product, automatically inserting the at least one product attribute in the alternative title for the product into a modified title for the product, and coordinating displaying of the modified title for the product on a website associated with the online retailer.

20 Claims, 5 Drawing Sheets

400

405 – Identifying, using a first set of rules, one or more product attributes in an existing title for the product.

410 – Determining, using a second set of rules, at least one product attribute to include in an alternative title for the product.

415 – Determining that the at least one product attribute in the alternative title for at least a first product of the plurality of products does not correspond to the one or more product attributes in the existing title for the first product.

420 – Automatically inserting, using a third set of rules, the at least one product attribute in the alternative title for the first product into a modified title for the first product.

425 – Coordinating displaying of the modified title for the first product on a website associated with the online retailer.

430 – Determining a new title of an additional product.

435 – Coordinating displaying of the new title for the additional product on the website associated with the online retailer.

FIG. 4

SYSTEMS AND METHODS FOR AUTOMATICALLY MODIFYING TITLES FOR PRODUCTS

TECHNICAL FIELD

This disclosure relates generally to automatic modification of titles for products on a website of an online retailer.

BACKGROUND

A common problem for online retailers is that, due to supplier information and other factors, multiple variants of products can often have the same title. Moreover, titles of products can often have errors or incorrect information presented in the title, and important product attributes also are often omitted from the title. Due to the millions of products regularly available for sale by the online retailer, humans cannot manually review and modify product titles to capture all of the differences between variants of the products. Conventional systems for solving this problem utilize a template-based approach, which can be ineffective when product attributes and values are missing from the catalog and/or not matching between the title and the catalog. Moreover, a template-based approach can be an inefficient operation and hinder performance for computer systems of the online retailer.

BRIEF DESCRIPTION OF THE DRAWINGS

To facilitate further description of the embodiments, the following drawings are provided in which:

FIG. 4 is a flowchart for a method, according to certain embodiments; and

Figure 1:
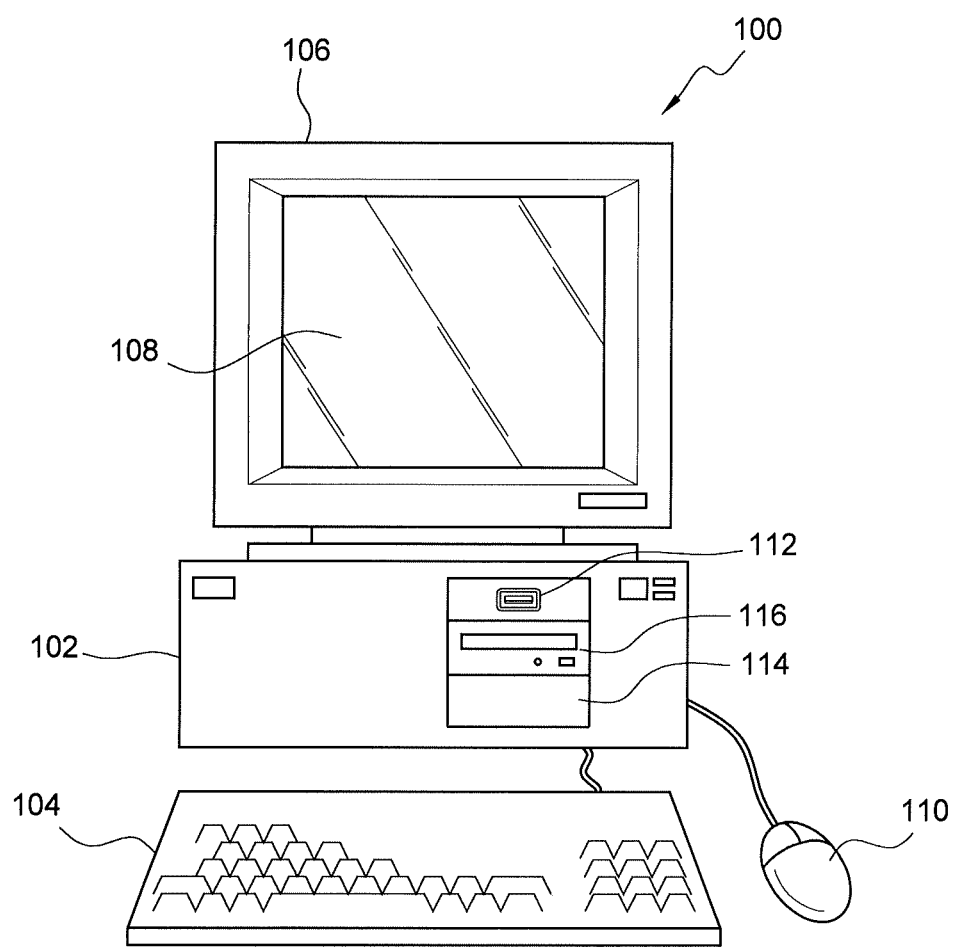
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of, for each product of a plurality of products of an online retailer, identifying, using a first set of rules, one or more product attributes in an existing title for the product. The one or more storage modules can be further configured to run on the one or more processing modules and perform an act of, for each product of a plurality of products of an online retailer, determining, using a second set of rules, at least one product attribute to include in an alternative title for the product. The one or more storage modules can be further configured to run on the one or more processing modules and perform an act of determining that the at least one product attribute in the alternative title for at least a first product of the plurality of products does not correspond to the one or more product attributes in the existing title for the first product. The one or more storage modules can be further configured to run on the one or more processing modules and perform an act of automatically inserting, using a third set of rules, the at least one product attribute in the alternative title for the first product into a modified title for the first product. The one or more storage modules can be further configured to run on the one or more processing modules and perform an act of coordinating displaying of the modified title for the first product on a website associated with the online retailer.

Various embodiments include a method. The method can include, for each product of a plurality of products of an online retailer, identifying, using a first set of rules, one or more product attributes in an existing title for the product. The method also can include, for each product of the plurality of products, determining, using a second set of rules, at least one product attribute to include in an alternative title for the product. The method also can include determining that the at least one product attribute in the alternative title for at least a first product of the plurality of products does not correspond to the one or more product attributes in the existing title for the first product. The method also can include automatically inserting, using a third set of rules, the at least one product attribute in the alternative title for the first product into a modified title for the first product. The method also can include coordinating displaying of the modified title for the first product on a website associated with the online retailer.

Figure 2:
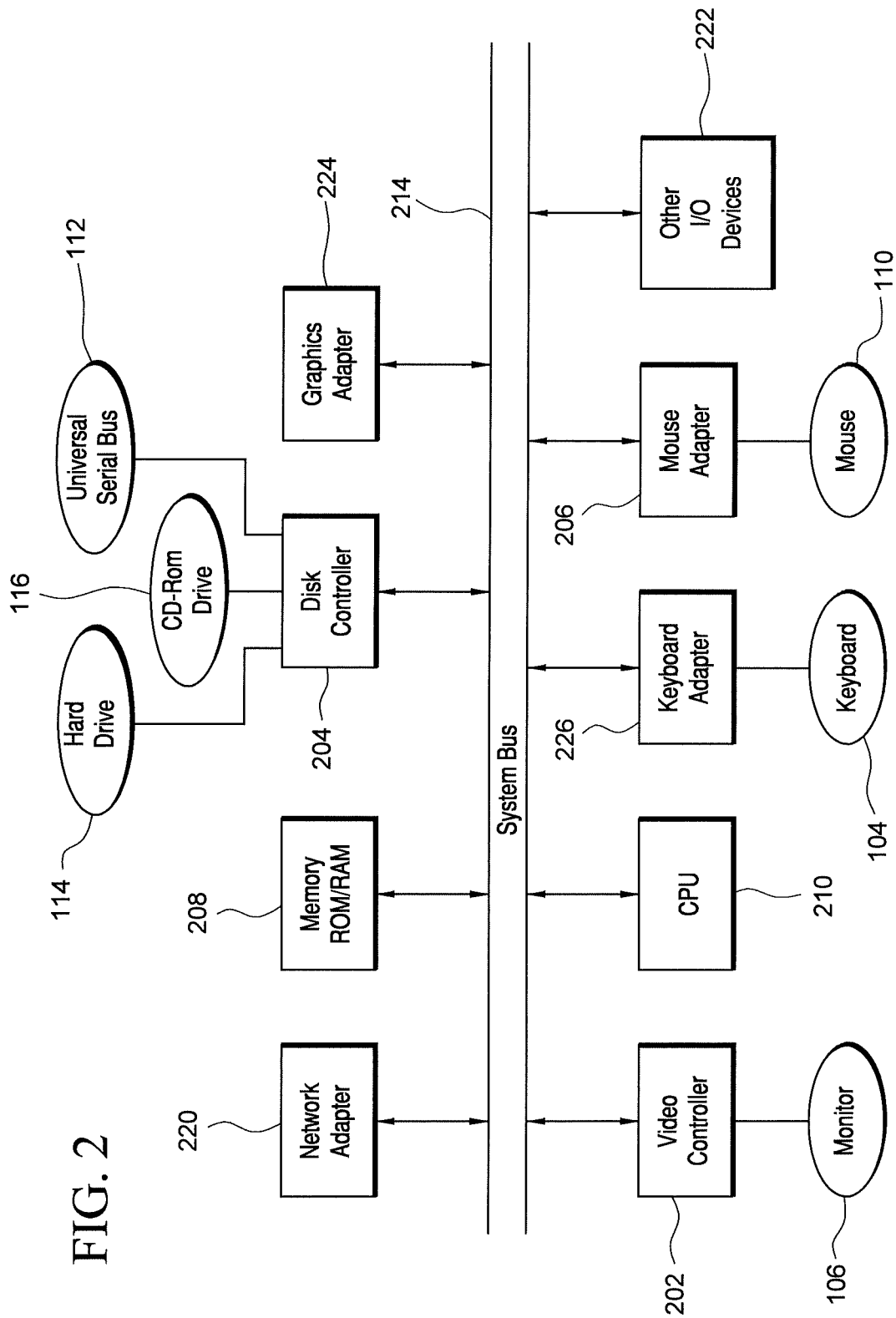
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
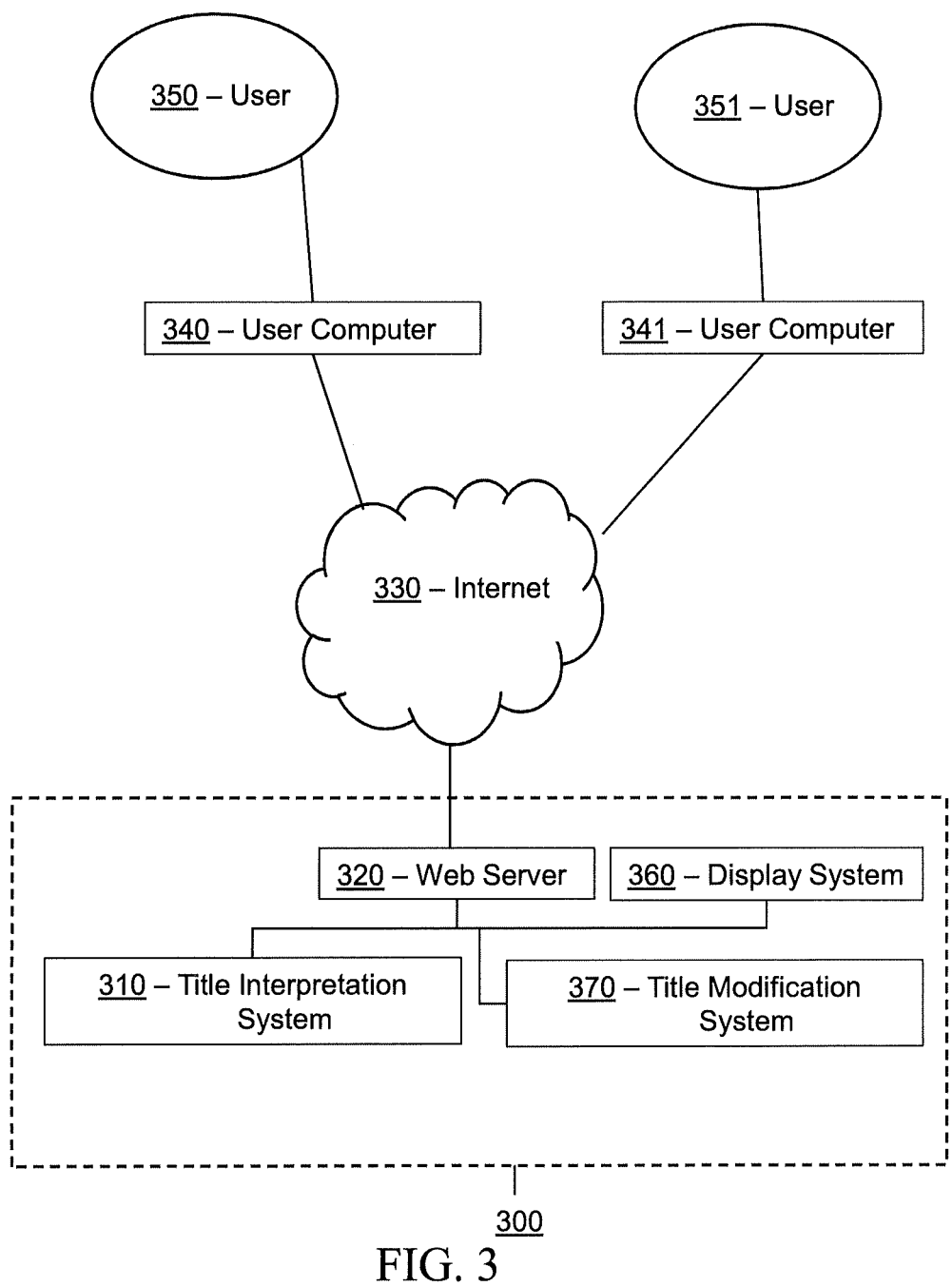
FIG. 3 illustrates a representative block diagram of a system, according to an embodiment.

Turning ahead in the drawings, FIG. 3 illustrates a block diagram of a system 300 that can be employed for modifying titles of products on a web site of an online retailer. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a title interpretation system 310, a web server 320, a display system 360, and a title modification system 370. Title interpretation system 310, web server 320, display system 360, and/or title modification system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of title interpretation system 310, web server 320, display system 360, and/or title modification system 370. Additional details regarding title interpretation system 310, web server 320, display system 360, and title modification system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, title interpretation system 310, web server 320, display system 360, and/or title modification system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) title interpretation system 310, web server 320, display system 360, and/or title modification system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of title interpretation system 310, web server 320, display system 360, and/or title modification system 370. In a similar manner, the processing module(s) and the memory storage module(s) can be local and/or remote to each other.

In many embodiments, title interpretation system 310, web server 320, display system 360, and/or title modification system 370 can be configured to communicate with one or more user computers 340 and 341. In some embodiments, user computers 340 and 341 also can be referred to as customer computers. In some embodiments, title interpretation system 310, web server 320, display system 360, and/or title modification system 370 can communicate or interface (e.g., interact) with one or more customer computers (such as user computers 340 and 341) through a network or internet 330. Internet 330 can be an intranet that is not open to the public. Accordingly, in many embodiments, title interpretation system 310, web server 320, display system 360, and/or title modification system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, title interpretation system 310, web server 320, display system 360, and/or title modification system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between title interpretation system 310, web server 320, display system 360, title modification system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
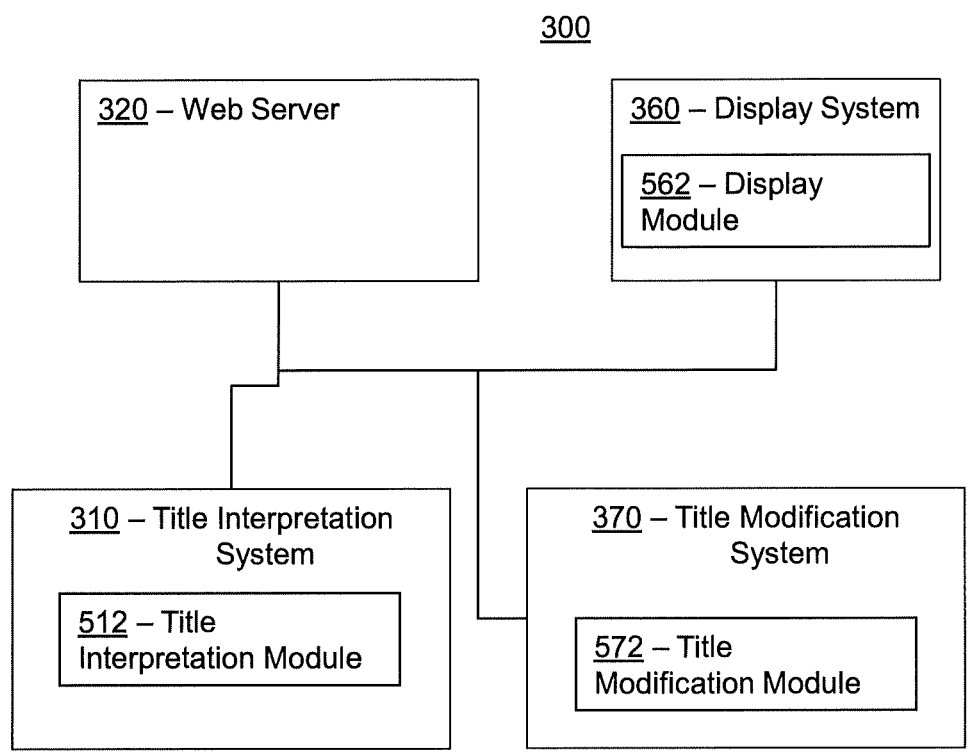
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, and/or 572 (FIG. 5). Such non-transitory memory storage modules can be part of a computer system such as title interpretation system 310, web server 320, display system 360, and/or title modification system 370 (FIGS. 3 & 5). The processing module(s) can be similar or identical to the processing module(s) described above with respect to computer system 100 (FIG. 1).

A common problem for online retailers is that, due to supplier information and other factors, multiple variants of products can often have the same title. Moreover, titles of products can often have errors or incorrect information presented in the title, and important product attributes also are often omitted from the title. Due to the millions of products regularly available for sale by the online retailer, humans cannot manually review and modify product titles to capture all of the differences between variants of the products. Conventional systems for solving this problem utilize a template-based approach, which can be ineffective when product attributes and values are missing from the catalog and/or not matching between the title and the catalog. Moreover, a template-based approach can be an inefficient operation and hinder performance for computer systems of the online retailer.

Method 400 can comprise an activity 405 of identifying, using a first set of rules, one or more product attributes in an existing title for the product. In many embodiments, activity 405 can be performed for each product of a plurality of products of an online retailer. Product attributes can comprise but are not limited to various attributes of a product, such as brand, model, product type, size, color, etc. For example, if a title of a computer product is "Dell XPS Laptop 15.6 Inch, Black," system 300 (FIG. 3) can identify attributes in the title as: (1) brand attribute: Dell; (2) model attribute: XPS; (3) product type attribute: laptop; (4) size attribute: 15.6 inch; and/or (5) color attribute: black. Advantageously, system 300 (FIG. 3) can interpret and/or identify a plurality of product attributes at the same time by determining a preferred combination of attributes that correctly represent the title of the product. For example, various embodiments of method 400 are scalable to allow system 300 (FIG. 3) to perform activity 405 on at least tens of millions of products of the online retailer. It is noted that while reference is made herein to an online retailer, the online retailer can comprise an exclusively online retailer, or an online retailer also associated with a brick and mortar retailer.

Identifying one or more product attributes in a title can be difficult for conventional systems due to one or more of the following: (1) information not being available for a given product; (2) generic titles, for example "multiple colors," "assorted colors," or "choose your own color;" (3) different variations of the same word or attribute value, for example "15 gb," "15 gigs," or "15 gigabyte;" (4) conflicts between entities, for example Apple as a brand of a product and Apple as a compatible brand for the product; and/or (5) incorrect text in a title, for example "Box 1 of 2."

To overcome these difficulties, in many embodiments, method 400 and/or activity 405 can comprise converting the existing title for the product into one or more n-gram words. In some embodiments, a shingle filter in a Lucene can be used to convert an existing title for a product into one or more n-gram words. In some embodiments, the number of n-gram words can be limited to a maximum of 5 or 6 gram words. Other embodiments can use other systems for converting or breaking a title into n-gram words. By way of a non-limiting example, an input title of "Accellorize Apple iPhone 4/4S Phone Case" can be converted in n-gram words of {Accellorize, Accellerorize Apple, Accellorize Apple iPhone, Apple iPhone, Apple iPhone 4, iPhone 4/4s case, etc.}.

In many embodiments, method 400 and/or activity 405 can next comprise an activity of normalizing each n-gram word of the one or more n-gram words from the existing title for the product. Basic normalization rules can be applied to improve matching accuracy.

Then, in many embodiments, method 400 and/or activity 405 can next comprise an activity of interpreting one or more possible entity candidates from the one or more n-gram words using one or more string matching techniques. Entity candidates can comprise different and sometimes unrelated product attributes. For example, "Apple" can be an entity of a brand and an entity of a fruit. More particularly, interpreting the one or more possible entity candidates from the one or more n-gram words using the one or more string matching techniques can comprise interpreting the one or more possible entity candidates by matching the one or more possible entity candidates to at least one of (1) a plurality of known product attributes for the product, (2) a taxonomy dictionary for a brand product line for the product, (3) a plurality of target values sorted by co-occurring counts of product attributes and product types, or (4) one or more regular expression matches. The one or more possible entity candidates can be matched to at least one of (1)-(4) using one or more of an exact string matching technique, such as a Aho Corasick Tries technique for interpreting multiple entities in Linear Time, or a fuzzy string matching technique.

In some embodiments, the activity of interpreting the one or more possible entity candidates from the one or more n-gram words can comprise interpreting the one or more possible entity candidates using at least the fuzzy string matching technique comprising a modified Jaro-Winkler algorithm and a search pruning feature. Even more particularly, using the search pruning feature can comprise using each known product attribute of the plurality of known product attributes in the modified Jaro-Winkler algorithm only if the known product attribute comprises an attribute value less than a predetermined number of characters.

It is noted that use of a conventional Jaro-Winkler algorithm for very long strings for tens of thousands of products requires a significant amount of both computer bandwidth and time. To improve the operating efficiency of system 300 (FIG. 3), many embodiments of method 400 utilize a modified approach to the Jaro-Winkler algorithm for interpreting and/or matching product attributes that can include, among other things, a search pruning feature. For example, the activity of interpreting one or more possible entity candidates from the one or more n-gram words using one or more string matching techniques can comprise determining a maximum possible score for co-occurring product attributes and product types. In more particular embodiments, the activity of determining the maximum possible score for co-occurring product attributes and product types can comprise, for each product of the plurality of products: (1) creating a first bitset for at least one first product attribute and a second bitset for at least one second product attribute, and also (2) determining the maximum possible score by determining a maximum number of characters in common between the first bit set and the second bit set. In many embodiments, the characters of the product attributes can be whole words, individual letters, and/or individual numbers. Determining the maximum possible score in this manner compares bitsets rather than each character in two strings.

Continuing on, the activity of interpreting one or more possible entity candidates from the one or more n-gram words using one or more string matching techniques within method 400 and/or activity 405 can further comprise, determining a Jaro-Winkler distance between the at least one first product attribute and the at least one second product attribute using the Jaro-Winkler algorithm if (and only if) the maximum possible score is greater than a first predetermined threshold. If the maximum possible score is less than the first predetermined threshold, no Jaro-Winkler distance is calculated using the Jaro-Winkler algorithm. Because computers are fast with bit level operations compared to string level operations, this activity can improve efficiency of operation for system 300 (FIG. 3) because system 300 (FIG. 3) is no longer required to calculate the Jaro-Winkler distance for every attribute value.

In many embodiments, method 400 and/or activity 405 can optionally comprise additional search pruning activities that can occur before or after any of the activities previously described. These additional search pruning activities also improve the operation of system 300 (FIG. 3) by reducing the computer bandwidth and overall time required to perform the activities of method 400. In some embodiments, for example, an additional search pruning activity can eliminate a portion of the matching required by system 300 (FIG. 3) based on a number of distinct values in attribute counts. Thus, method 400 and/or activity 405 also can comprise an activity of determining a number of distinct values for each of the one or more product attributes of the plurality of products in a catalog of the online retailer. This activity can determine, for example, that the internal catalog includes more than 20 million distinct global trade item numbers (GTIN) and more than 20 million distinct universal product codes (UPC). Because these counts are high, and thus unique to a particular product, there is no need for system 300 to compare these product attributes. Once a predetermined threshold is established, method 400 can optionally comprise activities of determining the number of distinct values for at least one of the one or more product attributes is above the predetermined threshold. Finally, method 400 and/or activity 405 also can optionally comprise an activity of withholding the at least one of the one or more product attributes that is above the predetermined threshold from, for each product of the plurality of products, matching the one or more product. The activity of withholding the at least one of the one or more product attributes, in turn, improves the overall efficiency of system 300 (FIG. 3) in performing method 400.

In some embodiments, an additional search pruning activity within method 400 and/or activity 405 can eliminate a portion of the matching required by system 300 (FIG. 3) based on a number of characters in an each product attribute. The number of characters can comprise one or more of (1) an average minimum number of character in a product attribute for the plurality of products, (2) an average maximum number of characters in a product attribute for the plurality of products, and/or (3) a standard deviation in the number of characters in a product attribute for a plurality of products. Thus, method 400 and/or activity 405 further can comprise an activity of determining, for each of the one or more product attributes of the plurality of products, at least one of (1) an average minimum number of characters, (2) an average maximum number of characters, or (3) a standard deviation of a number of characters.

For example, system 300 (FIG. 3) can determine that the standard deviation for the number of characters in the warranty information attribute for all of the plurality of products in the internal catalog is approximately 1100 words. This large standard deviation indicates that the number of characters in the warranty information varies greatly among the plurality of products. As another example, system 300 (FIG. 3) can determine that the standard deviation for the number of characters in the scent attribute for all of the plurality of products in the internal catalog is less than 10 characters. This small standard deviation indicates that the number of characters in the scent attributes varies little among the plurality of products. If, then, a product attribute is over 1000 characters, there is no need to compare the received product attribute for a product title.

In many embodiments, a predetermined threshold is established for variance from the average minimum number of characters, the average maximum number of characters, and/or the standard deviation of the number of characters of each product attribute. The predetermined threshold for variance can be proportional to the average minimum number of characters, the average maximum number of characters, and/or the standard deviation of the number of characters of each internal attribute. For example, a first product attribute with a higher standard deviation of the number of characters can have a larger (or wider) predetermined threshold for variance from the standard deviation than a second product attribute with a lower standard deviation of the number of characters. Method 400 and/or activity 405, then, can optionally comprise an activity of determining, for at least one of the one or more product attributes, at least one of (1) the average minimum number of characters is outside a third predetermined threshold, (2) the average maximum number of characters is outside the third predetermined threshold, or (3) the standard deviation of the number of characters is outside the third predetermined threshold.

If system 300 (FIG. 3) determines that a product attribute is outside the predetermined threshold, method 400 and/or activity 405 can then comprise an activity of withholding the at least one of the product attribute that is outside the third predetermined threshold from, for each product of the plurality of products, matching when interpreting the title of the each product of the plurality of products.

In many embodiments, method 400 and/or activity 405 can further comprise an activity of resolving any conflicting n-gram words of the one or more n-gram words from the existing title for the product. More particularly, a product type attribute co-occurrence count can be used to resolve overlapping token conflicts, with the longest matching token being used to resolve the conflict. For example, "Apple iPhone 4" can be used over "Apple iPhone 4/4S" because "Apple iPhone 4" is the longest matching token. A token is a word or sequence of words and/or numbers occurring in the title being interpreted.

In many embodiments, method 400 and/or activity 405 can further comprise an activity of resolving any conflicting entities from the one or more possible entity candidates. For example, in the title "Spigen Apple iPhone 6S Case," two conflicting entities are present: "Spigen" as a brand and "Apple" as a brand. System 300 (FIG. 3) can resolve the conflicting entities by determining that "Spigen" is the brand of the case.

In some embodiments, method 400 and/or activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Many embodiments of method 400 also can comprise activities to determine product attributes that the online retailer prefers to include in titles of products. For example, method 400 can further comprise an activity 410 of, for each product of a plurality of products of an online retailer, determining, using a second set of rules, at least one product attribute to include in an alternative title for the product. In more particular embodiments, activity 410 can comprise determining the at least one product attribute to include in the alternative title by determining an attribute importance score for each product attribute of a plurality of product attributes of the product using the second set of rules, the second set of rules comprising addition of a normalized facet score and a normalized title score By way of a non-limiting example, the second set of rules used in activity 410 can include consideration of variant attributes considered by the online retailer to be important to include in the title. Additionally, the top k=3 attributes to include in the title based on the attribute importance score can be identified at the shelf of the website of the online retailer by system 300 (FIG. 3). In some embodiments, the attribute importance score can be determined as follows:

Attribute importance score=0.5*(normalized_facet_score)+0.5*(normalized_title_score)

where:
normalized_facet_score=0 if the product attribute is not a facet, or else is the (number of clicks the attribute/facet received in a navigation bar of the website−minimum number of clicks any facet got in the navigation bar)/(maximum number of clicks any facet got in the navigation bar−minimum number of clicks any facet got in the navigation bar), and normalized_title_score=0 if the product attribute never appeared amongst the interpreted titles for the shelf, or else is the (number of times the attribute appeared in interpreted titles for the shelf−minimum number of times any attribute showed up amongst the interpreted titles for the shelf)/(maximum number of times any attribute showed up amongst the interpreted titles for the shelf−minimum number of times any attribute showed up amongst the interpreted titles for the shelf).

Many embodiments of method 400 also can comprise activities to determine if one or more product attributes that the online retailer has determined to include in the title of a product are actually in the title of the product. In many instances, the one or more product attributes that the online retailer has determined to include in the title of a product are not already in the title of the product that is displayed on the website of the online retailer. Thus, method 400 can further comprise an activity 415 of determining that the at least one product attribute in the alternative title for at least a first product of the plurality of products does not correspond to the one or more product attributes in the existing title for the first product.

When system 300 determines or otherwise identifies that a product attribute that should be in the title of a product displayed on the website of the online retailer is not in the title, system 300 can automatically insert the product attribute into the title for the product. Accordingly, method 400 can further comprise an activity 420 of automatically inserting, using a third set of rules, the at least one product attribute in the alternative title for the first product into a modified title for the first product.

In some embodiments, activity 420 can comprise training a language model using the one or more product attributes as identified in the existing title for each product of the plurality of products. For example, a language model can be trained using the titles, as interpreted, of the plurality of products on a shelf of the online website. In more particular embodiments, the language models can comprise one or more of a Kenser Neyes Language Model and/or an Interpolated Language Model. The input for each language model is the interpreted titles for the shelf, weighted by the number of clicks the products receive on the website of the online retailer.

For example, assume a shelf on the website of the online retailer has two items: item1: Nike black waterproof shoes; <brand> <color> waterproof <category>; and item2: Reebok red shoes size:9; <brand> <color> <category> <size>. The input to the language model would be:

<brand> <color> waterproof <category>
<brand> <color> waterproof <category>
<brand> <color><category><size>
<brand> <color><category><size>

Activity 420 can further comprise an activity of scoring each sequence of words of a plurality of sequences of words in the modified title for the first product. For example, once learned, the language model can be used to score the probability of a sentence or sequence of words/tags. From the preceding example, if "size" was identified as an important attribute for the sports shoes shelf and should be included in the title for item1, the language model as learned can be used to score each of the following sentences:

<brand> <size> <color> waterproof <category>
<brand> <color> <size> waterproof <category>
<brand> <color> waterproof <size> <category>
<brand> <color> waterproof <category> <size>

Activity 420 can then comprise an activity of determining and selecting a highest scoring sequence of words of the plurality of sequences of words in the modified title as scored. Once the highest scoring sequence has been determined, activity 420 can comprise an activity of inserting the at least one product attribute in the alternative title for the first product into the modified title for the first product according to the highest scoring sequence of words. Returning to the example above, "<brand> <color> waterproof <category> <size>" was determined to be the highest scoring sequence of words. With the attribute value automatically inserted, the modified title can read "Nike black waterproof shoes size:9."

Once the product attribute has been inserted into the title for the product by system 300 (FIG. 3), the modified title is ready for display on the website of the online retailer. Thus, method 400 can further comprise an activity 425 of coordinating displaying of the modified title for the first product on a website associated with the online retailer. In the same or different embodiment, activity 425 can include providing instructions for such displaying.

It is further noted that method 400 can be applied not only to modification of existing titles, but also to creation of completely new titles for display on the website of the online retailer. Thus, method 400 can optionally comprise an activity 430 of determining a new title for an additional product. In some embodiments, activity 430 can comprise an activity of receiving a seed template for the additional product. The seed template can be dictated by the online retailer or other third-party suppliers, merchandisers, and so on.

In some embodiments, activity 430 can further comprise an activity of determining, using the second set of rules as described above, at least one additional product attribute to include in the new title for the additional product. For example, system 300 (FIG. 3) can identify the commonly occurring free text not captured as attributes in the seed template in interpretations of other previously existing titles.

Finally, in some embodiments, activity 430 can further comprise an activity of automatically inserting, using the third set of rules, the at least one additional product attribute into the seed template for the additional product to create the new title for the additional product.

Once the additional product attribute has been inserted into the title for the additional product by system 300 (FIG. 3), the new title is ready for display on the website of the online retailer. Thus, method 400 can optionally comprise an activity 435 of coordinating displaying of the new title for the additional product on the website associated with the online retailer. In the same or different embodiment, activity 435 can include providing instructions for such displaying.

FIG. 5 illustrates a block diagram of a portion of system 300 comprising title interpretation system 310, web server 320, display system 360, and title modification system 370, according to the embodiment shown in FIG. 3. Each of title interpretation system 310, web server 320, display system 360, and title modification system 370, is merely exemplary and not limited to the embodiments presented herein. Each of title interpretation system 310, web server 320, display system 360, and/or title modification system 370, can be employed in many different embodiments or examples not specifically depicted or described herein. In some embodiments, certain elements or modules of title interpretation system 310, web server 320, display system 360, and/or title modification system 370, can perform various procedures, processes, and/or acts. In other embodiments, the procedures, processes, and/or acts can be performed by other suitable elements or modules.

In many embodiments, title interpretation system 310 can comprise non-transitory memory storage module 512. Memory storage module 512 can be referred to as title interpretation module 512. In many embodiments, title interpretation module 512 can store computing instructions configured to run on one or more processing modules and perform one or more acts of method 400 (FIG. 4) (e.g., activity 405 of identifying, using a first set of rules, one or more product attributes in an existing title for the product, activity 410 of determining, using a second set of rules, at least one product attribute to include in an alternative title for the product, and activity 430 of determining a new title of an additional product (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (FIG. 4) (e.g., activity 425 of coordinating displaying of the modified title for the first product on a website associated with the online retailer, and activity 435 of coordinating displaying of the new title for the additional product on the website associated with the online retailer (FIG. 4)).

In many embodiments, title modification system 370 can comprise non-transitory storage module 572. Memory storage module 572 can be referred to as title modification module 572. In many embodiments, title modification module 572 can store computing instructions configured to run on one or more processing modules and perform one or more acts of method 400 (FIG. 4) (e.g., activity 415 of determining that the at least one product attribute in the alternative title for at least a first product of the plurality of products does not correspond to the one or more product attributes in the existing title for the first product, and activity 420 of automatically inserting, using a third set of rules, the at least one product attribute in the alternative title for the first product into a modified title for the first product (FIG. 4)).

Although systems and methods for automatically modifying a title of product have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform acts of:
for each respective product of a plurality of products of an online retailer:
identifying, using a first set of rules, one or more respective product attributes in an existing title for the respective product; and
determining, using a second set of rules, at least one respective product attribute of the one or more respective product attributes to include in an alternative title for the respective product by determining an attribute importance score for each respective product attribute of a plurality of product attributes of the respective product using the second set of rules;
determining that at least one first product attribute in a first alternative title for at least a first product of the plurality of products does not correspond to one or more first product attributes in a first existing title for the first product;
automatically inserting, using a third set of rules, the at least one first product attribute in the first alternative title for at least the first product into a first modified title for the first product; and
coordinating displaying of the first modified title for the first product on a website associated with the online retailer.

2. The system of claim 1, wherein identifying, using the first set of rules, the one or more respective product attributes in the existing title for the respective product comprises, for each respective product of the plurality of products:
converting the existing title for the respective product into one or more n-gram words;
normalizing each n-gram word of the one or more n-gram words from the existing title for the respective product;
interpreting one or more possible entity candidates from the one or more n-gram words using one or more string matching techniques;
resolving one or more conflicting n-gram words of the one or more n-gram words from the existing title for the respective product; and
resolving one or more conflicting entities from the one or more possible entity candidates.

3. The system of claim 2, wherein interpreting the one or more possible entity candidates from the one or more n-gram words using the one or more string matching techniques comprises:
interpreting the one or more possible entity candidates by matching, using one or more of (1) an exact string matching technique or (2) a fuzzy string matching technique, the one or more possible entity candidates to at least one of:
a plurality of known product attributes for the respective product;
a taxonomy dictionary for a brand product line for the respective product;
a plurality of target values sorted by co-occurring counts of product attributes and product types; or
one or more regular expression matches.

4. The system of claim 3, wherein interpreting the one or more possible entity candidates from the one or more n-gram words comprises:
interpreting the one or more possible entity candidates using at least (2) the fuzzy string matching technique comprising:
a modified Jaro-Winkler algorithm; and
a search pruning feature.

5. The system of claim 4, wherein using the search pruning feature comprises:
using each respective known product attribute of the plurality of known product attributes for the respective product in the modified Jaro-Winkler algorithm when the respective known product attribute comprises an attribute value less than a predetermined number of characters.

6. The system of claim 1, wherein the second set of rules comprises a normalized facet score and a normalized title score.

7. The system of claim 1, wherein automatically inserting, using the third set of rules, the at least one first product attribute in the first alternative title for the first product into the first modified title for the first product comprises:
training a language model using the one or more respective product attributes, as identified, in a respective existing title for each respective product of the plurality of products;
scoring each sequence of words of a plurality of sequences of words in the first modified title for the first product;
determining a highest scoring sequence of words of the plurality of sequences of words in the first modified title as scored; and
inserting the at least one first product attribute in the first alternative title for at least the first product into the first modified title for the first product according to the highest scoring sequence of words.

8. The system of claim 1, wherein the one or more non-transitory storage devices storing the computing instructions are further configured to run on the one or more processors and perform acts of:
determining a new title of an additional product; and
coordinating displaying of the new title for the additional product on the website associated with the online retailer.

9. The system of claim 8, wherein determining the new title of the additional product comprises:
receiving a seed template for the additional product;
determining, using the second set of rules, at least one additional product attribute to include in the new title for the additional product; and
automatically inserting, using the third set of rules, the at least one additional product attribute into the seed template for the additional product to create the new title for the additional product.

10. The system of claim 1, wherein:
identifying, using the first set of rules, the one or more respective product attributes in the existing title for the respective product comprises, for each respective product of the plurality of products:
converting the existing title for the respective product into one or more n-gram words;
normalizing each n-gram word of the one or more n-gram words from the existing title for the respective product;
interpreting the one or more possible entity candidates from the one or more n-gram words by:
matching, using at least a fuzzy string matching technique comprising a modified Jaro-Winkler algorithm and a search pruning feature, the one or more possible entity candidates to at least one of:
a plurality of known product attributes for the respective product;
a taxonomy dictionary for a brand product line for the respective product;
a plurality of target values sorted by co-occurring counts of product attributes and product types; or
one or more regular expression matches, wherein:
using the search pruning feature comprises using each respective known product attribute of the plurality of known product attributes for the respective product in the modified Jaro-Winkler algorithm when the respective known product attribute comprises an attribute value less than a predetermined number of characters;
resolving one or more conflicting n-gram words of the one or more n-gram words from the existing title for the respective product; and
resolving one or more conflicting entities from the one or more possible entity candidates;
the second set of rules comprises a normalized facet score and a normalized title score;
automatically inserting, using the third set of rules, the at least one first product attribute in the first alternative title for at least the first product into the first modified title for the first product comprises:
training a language model using the one or more respective product attributes, as identified, in a respective existing title for each respective product of the plurality of products;
scoring each sequence of words of a plurality of sequences of words in the first modified title for the first product;
determining a highest scoring sequence of words of the plurality of sequences of words in the first modified title as scored; and
inserting the at least one first product attribute in the first alternative title for at least the first product into the first modified title for the first product according to the highest scoring sequence of words; and
the one or more non-transitory storage devices storing the computing instructions are further configured to run on the one or more processors and perform acts of:
determining a new title of an additional product by:
receiving a seed template for the additional product;
determining, using the second set of rules, at least one additional product attribute to include in the new title for the additional product; and
automatically inserting, using the third set of rules, the at least one additional product attribute into the seed template for the additional product to create the new title for the additional product; and coordinating displaying of the new title for the additional product on the website associated with the online retailer.

11. A method being implemented via execution of computing instructions configured to run at one or more processors and configured to be stored at non-transitory computer-readable media, the method comprising:
for each respective product of a plurality of products of an online retailer:
identifying, using a first set of rules, one or more respective product attributes in an existing title for the respective product; and
determining, using a second set of rules, at least one respective product attribute of the one or more respective product attributes to include in an alternative title for the respective product by determining an attribute importance score for each respective product attribute of a plurality of product attributes of the respective product using the second set of rules;
determining that at least one first product attribute in a first alternative title for at least a first product of the plurality of products does not correspond to one or more first product attributes in a first existing title for the first product;
automatically inserting, using a third set of rules, the at least one first product attribute in the first alternative title for at least the first product into a first modified title for the first product; and
coordinating displaying of the first modified title for the first product on a website associated with the online retailer.

12. The method of claim 11, wherein identifying, using the first set of rules, the one or more respective product attributes in the existing title for the respective product comprises, for each respective product of the plurality of products:
converting the existing title for the respective product into one or more n-gram words;
normalizing each n-gram word of the one or more n-gram words from the existing title for the respective product;
interpreting one or more possible entity candidates from the one or more n-gram words using one or more string matching techniques;
resolving one or more conflicting n-gram words of the one or more n-gram words from the existing title for the respective product; and
resolving one or more conflicting entities from the one or more possible entity candidates.

13. The method of claim 12, wherein interpreting the one or more possible entity candidates from the one or more n-gram words using the one or more string matching techniques comprises:
interpreting the one or more possible entity candidates by matching, using one or more of (1) an exact string matching technique or (2) a fuzzy string matching technique, the one or more possible entity candidates to at least one of:
a plurality of known product attributes for the respective product;
a taxonomy dictionary for a brand product line for the respective product;
a plurality of target values sorted by co-occurring counts of product attributes and product types; or
one or more regular expression matches.

14. The method of claim 13, wherein interpreting the one or more possible entity candidates from the one or more n-gram words comprises:
interpreting the one or more possible entity candidates using at least (2) the fuzzy string matching technique comprising:
a modified Jaro-Winkler algorithms; and
a search pruning feature.

15. The method of claim 14, wherein using the search pruning feature comprises:
using each respective known product attribute of the plurality of known product attributes for the respective product in the modified Jaro-Winkler algorithm when the respective known product attribute comprises an attribute value less than a predetermined number of characters.

16. The method of claim 11, wherein
the second set of rules comprises addition of a normalized facet score and a normalized title score.

17. The method of claim 11, wherein automatically inserting, using the third set of rules, the at least one first product attribute in the first alternative title for the first product into the first modified title for the first product comprises:
training a language model using the one or more respective product attributes, as identified, in a respective existing title for each respective product of the plurality of products;
scoring each sequence of words of a plurality of sequences of words in the first modified title for the first product;
determining a highest scoring sequence of words of the plurality of sequences of words in the first modified title as scored; and
inserting the at least one first product attribute in the first alternative title for at least the first product into the first modified title for the first product according to the highest scoring sequence of words.

18. The method of claim 11, further comprising:
determining a new title of an additional product; and
coordinating displaying of the new title for the additional product on the website associated with the online retailer.

19. The method of claim 18, wherein determining the new title of the additional product comprises:
receiving a seed template for the additional product;
determining, using the second set of rules, at least one additional product attribute to include in the new title for the additional product; and
automatically inserting, using the third set of rules, the at least one additional product attribute into the seed template for the additional product to create the new title for the additional product.

20. The method of claim 11, wherein:
identifying, using the first set of rules, the one or more respective product attributes in the existing title for the respective product comprises, for each respective product of the plurality of products:
converting the existing title for the respective product into one or more n-gram words;
normalizing each n-gram word of the one or more n-gram words from the existing title for the respective product;
interpreting the one or more possible entity candidates from the one or more n-gram words by:
matching, using at least a fuzzy string matching technique comprising a modified Jaro-Winkler algorithm and a search pruning feature, the one or more possible entity candidates to at least one of:
  a plurality of known product attributes for the respective product;
  a taxonomy dictionary for a brand product line for the respective product;
  a plurality of target values sorted by co-occurring counts of product attributes and product types; or
  one or more regular expression matches, wherein:
    using the search pruning feature comprises using each respective known product attribute of the plurality of known product attributes for the respective product in the modified Jaro-Winkler algorithm when the respective known product attribute comprises an attribute value less than a predetermined number of characters;
  resolving one or more conflicting n-gram words of the one or more n-gram words from the existing title for the respective product; and
  resolving one or more conflicting entities from the one or more possible entity candidates;
the second set of rules comprises a normalized facet score and a normalized title score;
automatically inserting, using the third set of rules, the at least one first product attribute in the first alternative title for the first product into the first modified title for the first product comprises:
  training a language model using the one or more respective product attributes, as identified, in a respective existing title for each respective product of the plurality of products;
  scoring each sequence of words of a plurality of sequences of words in the first modified title for the first product;
  determining a highest scoring sequence of words of the plurality of sequences of words in the first modified title as scored; and
  inserting the at least one first product attribute in the first alternative title for the first product into the first modified title for the first product according to the highest scoring sequence of words; and
the method further comprises:
  determining a new title of an additional product by:
    receiving a seed template for the additional product;
    determining, using the second set of rules, at least one additional product attribute to include in the new title for the additional product; and
    automatically inserting, using the third set of rules, the at least one additional product attribute into the seed template for the additional product to create the new title for the additional product; and
  coordinating displaying of the new title for the additional product on the website associated with the online retailer.

* * * * *